United States Patent  
Dennis et al.

(10) Patent No.: US 8,527,275 B2
(45) Date of Patent: Sep. 3, 2013

(54) TRANSFORMING A TACTUALLY SELECTED USER INPUT INTO AN AUDIO OUTPUT

(75) Inventors: Fantin Dennis, Cayucos, CA (US); C. Arthur MacCarley, Nipomo, CA (US)

(73) Assignee: Cal Poly Corporation, San Luis Obispo, CA (US)

( * ) Notice: Subject to any disclaimer, the term of this patent is extended or adjusted under 35 U.S.C. 154(b) by 1048 days.

(21) Appl. No.: 12/505,232

(22) Filed: Jul. 17, 2009

(65) Prior Publication Data

US 2011/0015929 A1     Jan. 20, 2011

(51) Int. Cl.
*G10L 13/00*     (2006.01)

(52) U.S. Cl.
USPC ............................ 704/258; 704/260; 434/116

(58) Field of Classification Search
USPC ................................ 704/258, 260; 434/116
See application file for complete search history.

(56) References Cited

U.S. PATENT DOCUMENTS

| | | | | |
|---|---|---|---|---|
| 5,636,038 A * | 6/1997 | Lynt et al. | ...................... | 358/471 |
| 2004/0098256 A1 * | 5/2004 | Nissen | ........................... | 704/220 |
| 2007/0212668 A1 * | 9/2007 | Takami et al. | ................. | 434/113 |

OTHER PUBLICATIONS

Collaborative Effort creates "speaking" periodic table of the elements; Fantin, D., Macarley A, "Engineering Advantage," Fall 2008.
"CalPoly High-Tech Industry Breakfast Forum," Dunning, J.May 29, 2009.
"Speak & Spell (toy)", downloaded from http://en.wikipedia.org/wiki/Speak_&_Spell_(toy) Jul. 17, 2009.

* cited by examiner

*Primary Examiner* — Daniel D Abebe
(74) *Attorney, Agent, or Firm* — SoCal IP Law Group LLP; Mark A. Goldstein

(57) ABSTRACT

A contextual input device includes a plurality of tactually discernable keys disposed in a predetermined configuration which replicates a particular relationship among a plurality of items associated with a known physical object. The tactually discernable keys are typically labeled with Braille type. The known physical object is typically a collection of related items grouped together by some common relationship. A computer-implemented process determines whether an input signal represents a selection of an item from among a plurality of items or an attribute pertaining to an item among the plurality of items. Once the selected item or attribute pertaining to an item is determined, the computer-implemented process transforms a user's selection from the input signal into an analog audio signal which is then audibly output as human speech with an electro-acoustic transducer.

20 Claims, 7 Drawing Sheets

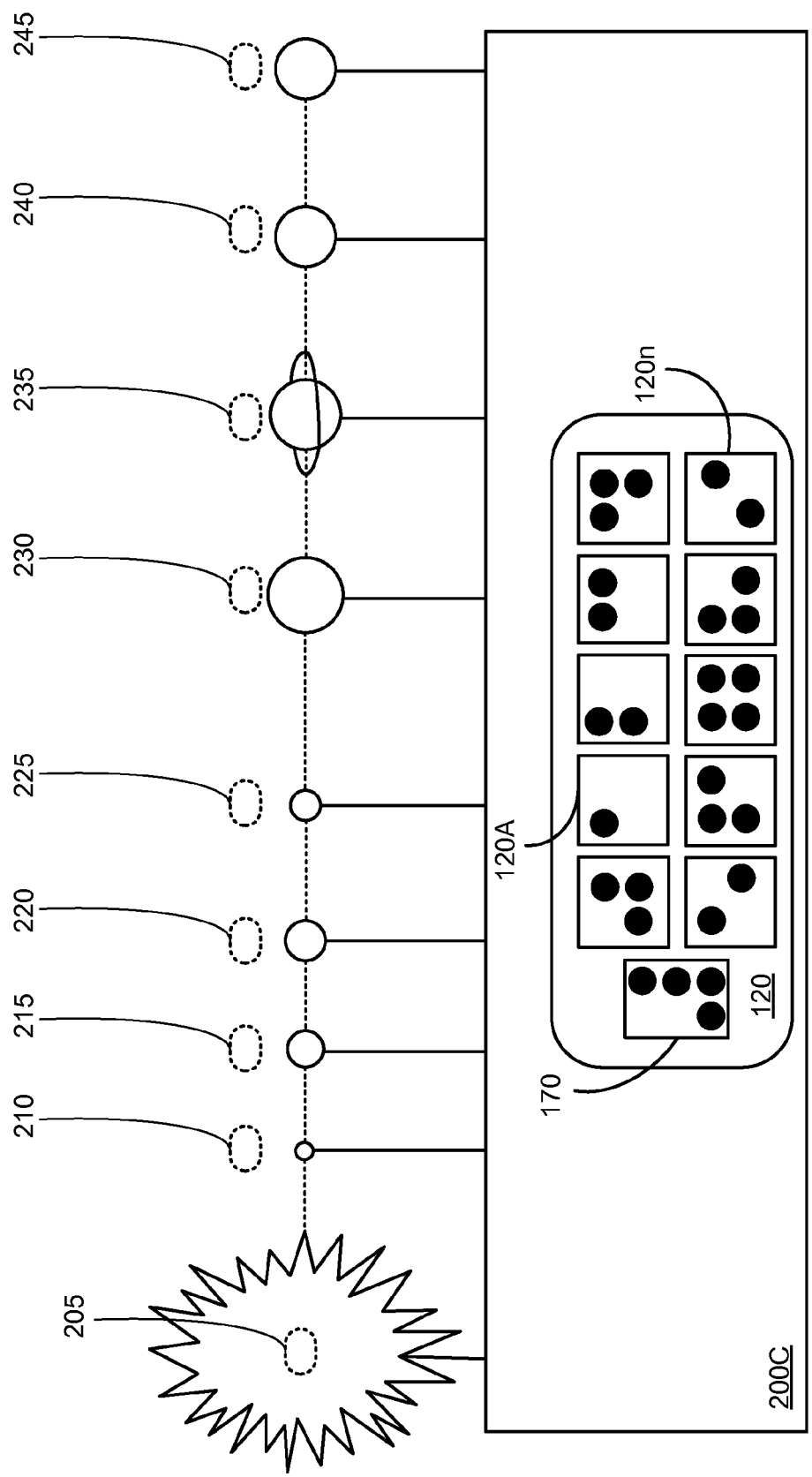

TRANSFORMING A TACTUALLY SELECTED USER INPUT INTO AN AUDIO OUTPUT

CROSS-REFERENCE AND PRIORITY CLAIM TO RELATED APPLICATIONS

Not applicable.

RELEVANT FIELD

The present disclosure generally relates to a computer implementation and more specifically to a computer-implemented process and apparatus for presenting information in a particular physical format and for transforming this information into an audio output based upon a user's tactile selection.

OVERVIEW

Visually impaired individuals are frequently challenged by difficulties in perceiving spatial and/or other relationships using available tactual information. This situation presents itself in numerous ways to a visually impaired person in everyday life as there are few frames of reference available through the sense of touch from which he or she may conceptualize the world around them. Accordingly, there is a need in the relevant art that provides a way for a visually impaired person to conceptualize spatial and/or other relationships using the sense of touch. The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

BRIEF DESCRIPTION OF THE DRAWINGS

The features and advantages of the various exemplary embodiments disclosed herein will become apparent from the following detailed description when considered in conjunction with the accompanying drawings. Where possible, the same reference numerals and characters are used to denote like features, elements, components or portions of various exemplary embodiments. It is intended that changes and modifications can be made to the described exemplary embodiments without departing from the true scope and spirit of the inventive embodiments as defined by the claims.

FIG. 2C—depicts a third contextual input device in accordance with an exemplary embodiment.

GENERAL OVERVIEW

Figure 1:
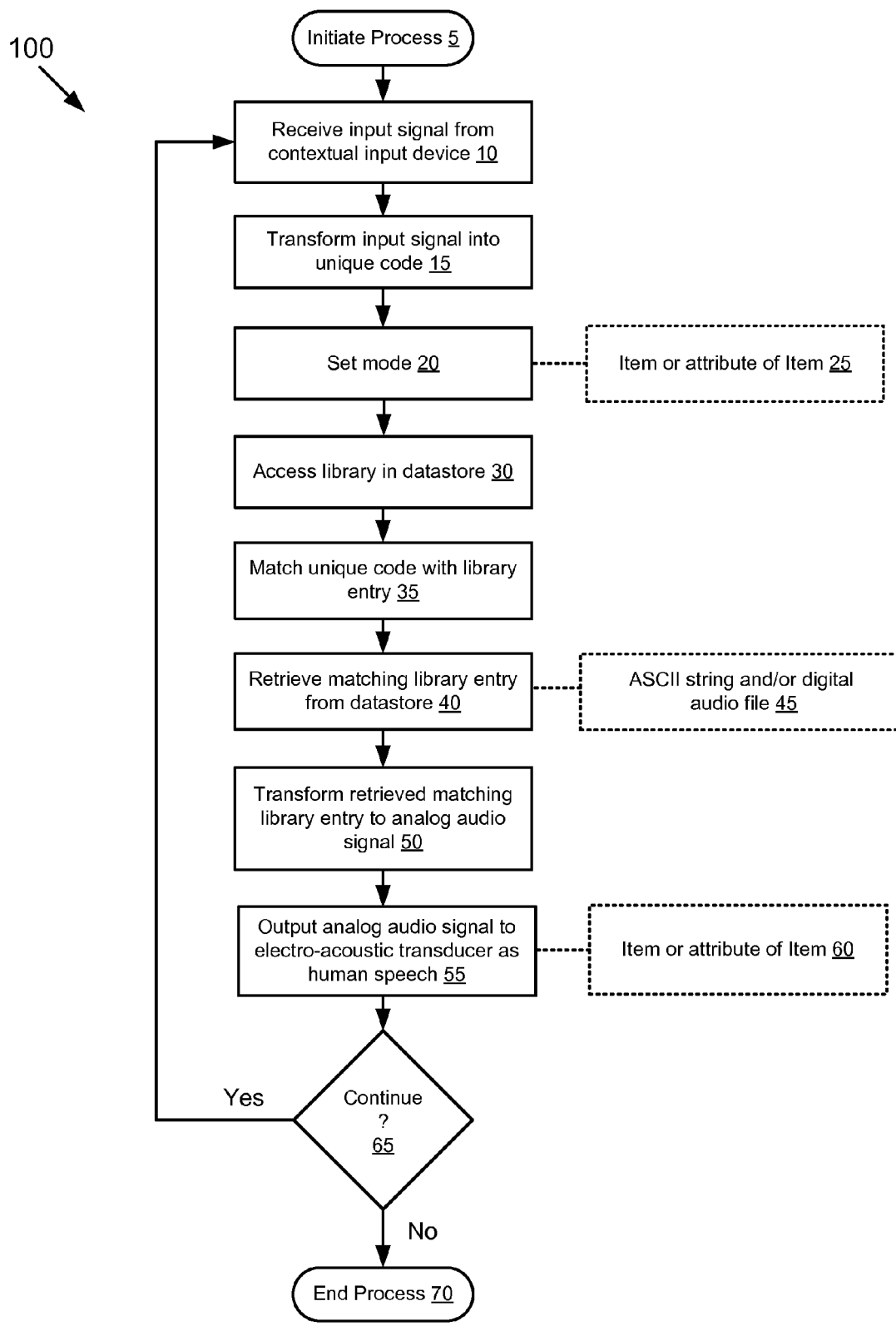
FIG. 1—depicts an exemplary flow chart illustrating a computer-implemented process for transforming a user input into an audio output.

The various exemplary embodiments described herein address certain of the limitations in the relevant art and provides a computer-implemented process for transforming a user input into an audio output. System and computer program product embodiments are also described. In an exemplary embodiment, an input signal is generated and sent from a contextual input device based on a user's tactile selection. The contextual input device includes a plurality of tactually discernable keys disposed in a spatial and/or size relationship which replicates a particular relationship among a plurality of items associated with a known physical object. In an exemplary embodiment, the tactually discernable keys are typically labeled with Braille type.

The known physical object is typically a collection of related items grouped together by some common relationship. A computer-implemented process determines whether the input signal represents a selection of an item from among a plurality of items or an attribute pertaining to an item among the plurality of items. Once the selected item or attribute pertaining to an item is determined, the computer-implemented process transforms a user's selection from the input signal into an analog audio signal which is then audibly output as human speech with an electro-acoustic transducer.

In an exemplary embodiment, transforming the input signal into an analog audio signal is performed by transforming the input signal into a unique code (e.g., ASCII text string), matching the unique code with a library entry contained in a datastore and audibly outputting the library entry as human speech.

In an exemplary embodiment, each of the plurality of items represent individual subjects and each of the attributes represent a fact about one or more of the individual subjects. For example, when the known physical object is a periodic table of the elements, the plurality of items are the elements listed in the periodic table of the elements and the attributes are properties pertaining to the elements listed in the periodic table of elements. By way of example and not limitation, the properties may be an electronic property of an element, a chemical property of an element, a nuclear property of an element or a physical property of an element. Thus, a user may tactually select an element using keys of the contextual input device and audibly outputting various facts about one or more of the elements.

In an exemplary embodiment, the layout of the keys of the contextual input device is such that the spatial relationships to one another mirrors the placement of the elements listed in the periodic table of the elements. Alternately, a user may tactually select an attribute about an element using another set of tactile keys, by way of example and not limitation, the density of the element.

In an exemplary embodiment, the outputted analog signal is generated using electronically synthesized speech or pre-recorded speech which has been digitized and stored in a datastore.

DETAILED DESCRIPTION

Various exemplary embodiments of a computer-implemented process and contextual input device are described. In the following description, for the purposes of explanation, numerous specific details are set forth in order to provide a thorough understanding of the various exemplary inventive features. It will be apparent, however, to a person having ordinary skill in the art that the various exemplary inventive features may be practiced without these specific details.

Figure 2A:
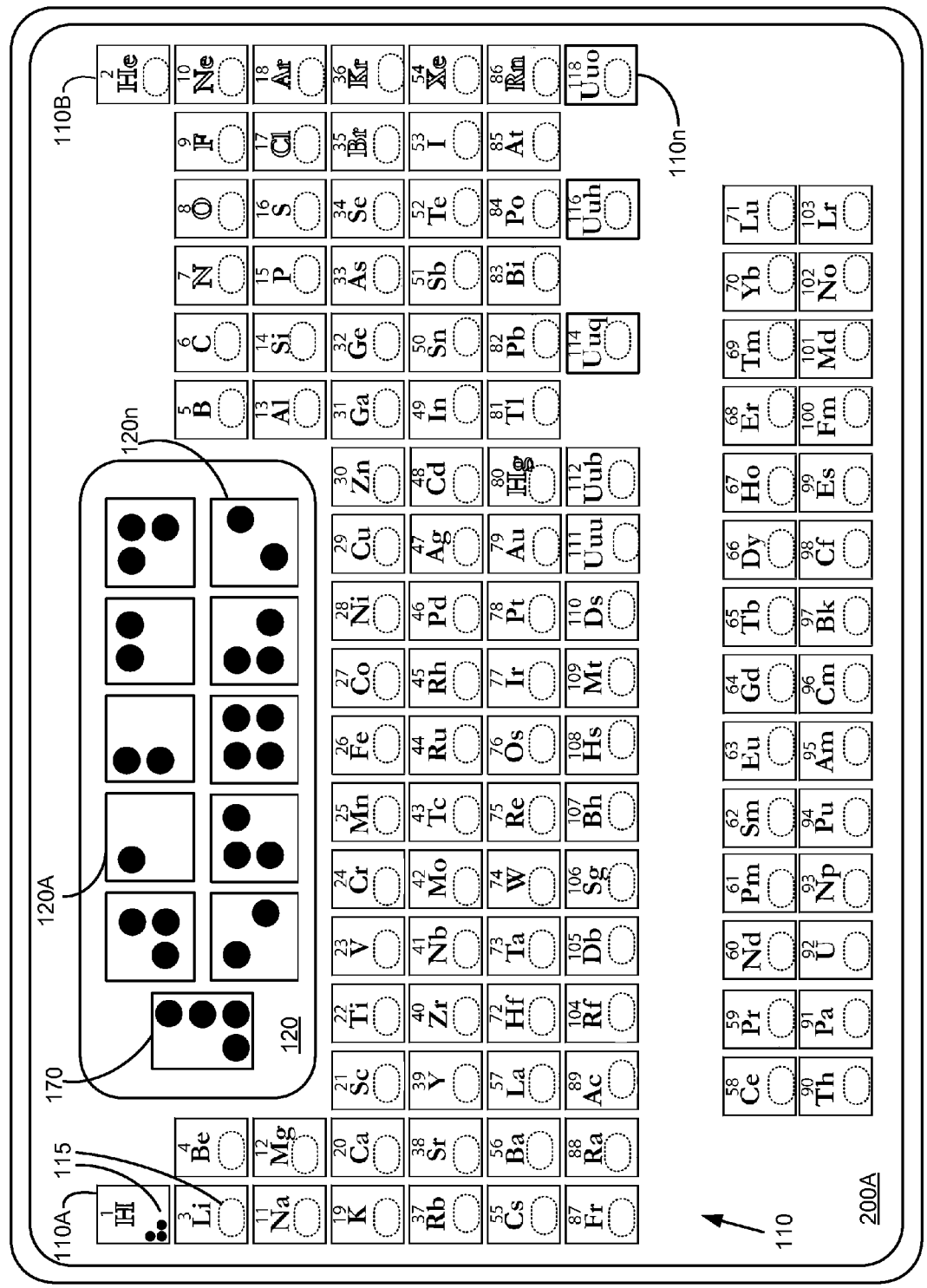
FIG. 2A—depicts a first contextual input device in accordance with an exemplary embodiment.
Figure 2B:
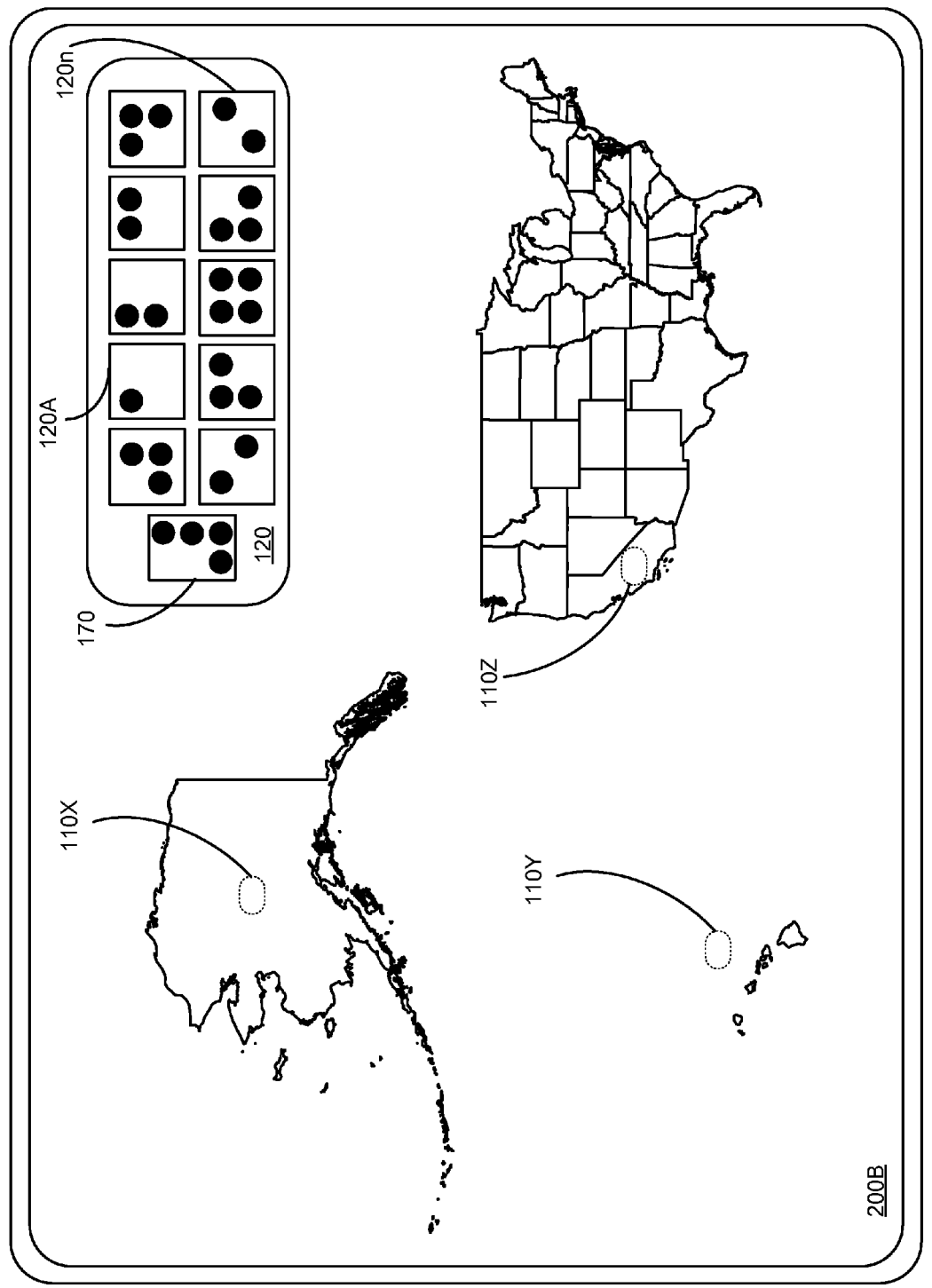
FIG. 2B—depicts a second contextual input device in accordance with an exemplary embodiment.

FIG. 1 depicts an exemplary flow chart for a computer-implemented process for transforming a user input into an audio output. The computer-implemented process for transforming a user input into an audio output 100 is initiated at block 5 when a user provides a selection to a contextual input device 200A, 200B, 200C (FIG. 2A, FIG. 2B, 2C).

Figure 3:
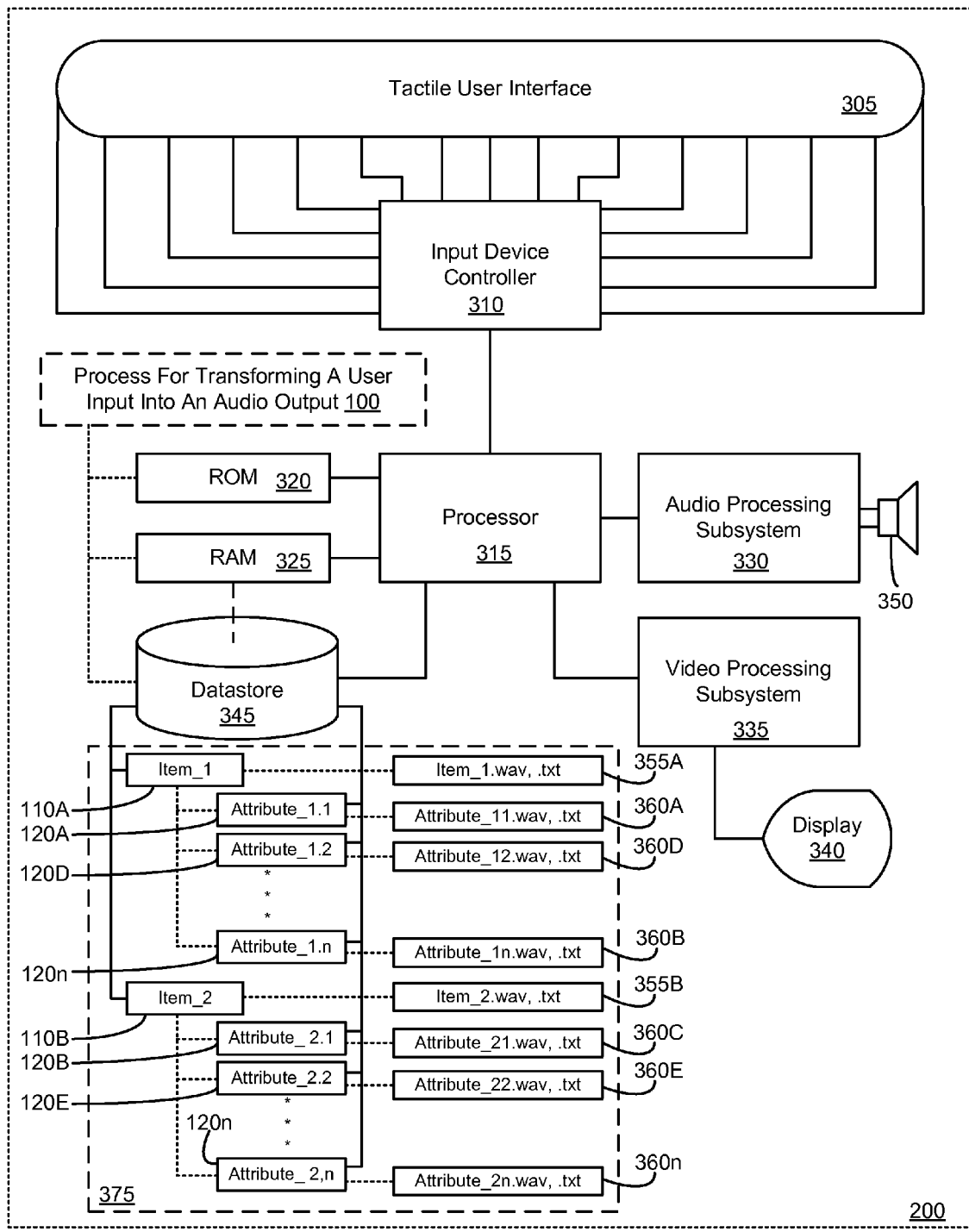
FIG. 3—depicts a detailed block diagram of a contextual input device in accordance with an exemplary embodiment.

At block 10, the user entered selection is received as a state change signal or interrupt from the tactile user interface 305 (FIG. 3) and typically processed by an input device controller 310 (FIG. 3). In an exemplary embodiment, the input device controller 310 (FIG. 3) transforms the input signal into a unique code 15 which is used by the computer-implemented process for transforming a user input into an audio output 100 to set a operability mode as shown at block 20. By way of example and not limitation, the user may optionally select an item 110A (FIG. 1A) or an attribute of an item 120A (FIG. 1B) as shown at block 25. Set mode block 20 is optional in most embodiments. The computer-implemented process for transforming a user input into an audio output 100 continues at block 30 by accessing a library contained in a datastore 345 (FIG. 3). In an exemplary embodiment, the unique code is used as an index to match with a corresponding library entry as shown at block 35. At block 40, the computer implemented process for transforming a user input into an audio output 100 retrieves the matching library entry. In an exemplary embodiment, the matching library entry may be a text string (e.g., ASCII), a digital audio file or a combination of both as shown at block 45.

At block 50, the computer-implemented process for transforming a user input into an audio output 100 transforms the retrieved matching library entry into an analog audio signal. The analog audio signal is then output to an electro-acoustic transducer as human speech as shown at block 55. The outputted analog audio signal may represent an item or an attribute of an item as shown at block 60. Typically, the outputted analog audio signal is provided in the form of speech. However, embodiments are envisioned in which the outputted analog audio signal is provided as sound(s) associated with a particular item.

At decision block 65, the computer-implemented process for transforming a user input into an audio output 100 waits for the user to enter another selection into a contextual input device as shown at block 10 or ends the process for transforming a user input into an audio output 100 at block 70.

Figure 1A:
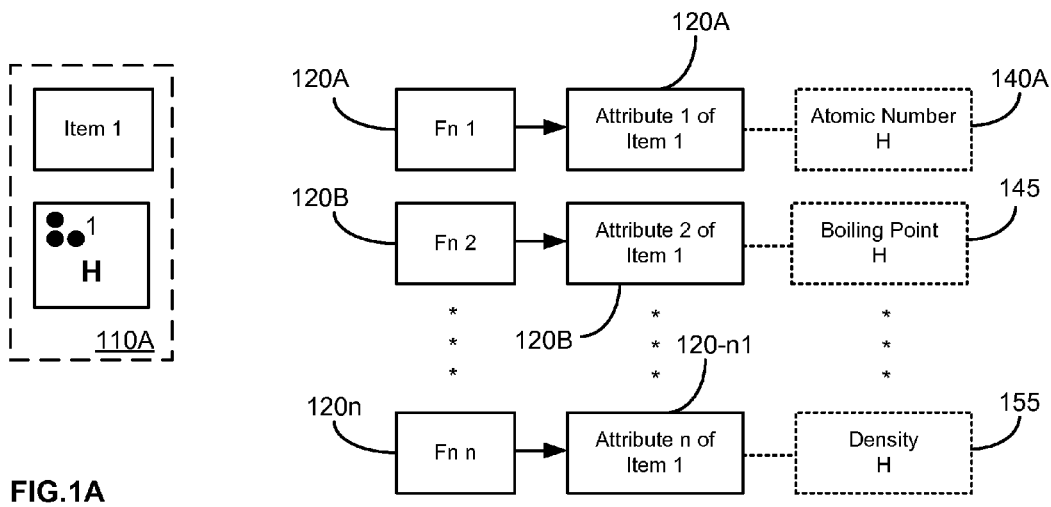
FIG. 1A—depicts selection of one or more contextual items in accordance with an exemplary embodiment.

FIG. 1A depicts one exemplary embodiment where the tactile user interface 305 (FIG. 3) is configured in the context of a periodic table of the elements (FIG. 2A). In this exemplary embodiment, each element included in the periodic table of the elements represents an item 110. Attributes 120 for each element included the periodic table of the elements represent a physical, chemical, electronic or nuclear property. In an exemplary embodiment, the various attributes 120 are selected using a set of function keys (FIG. 2A). One skilled in the art will appreciate that other arrangements may be used to toggle between item selection and attribute selection, for example, by "double-clicking" an item key. In this exemplary embodiment, the user first tactually selects using Braille type an item 110A, which in this example, refers to the element "Hydrogen". The computer-implemented process for transforming a user input into an audio output 100 then audibly outputs the spoken word "Hydrogen".

The user may then tactually select a first function key 120A which is configured to return and audibly output the first attribute of the element hydrogen, which in this example, is the atomic number of hydrogen or "One." Once the item 110 has been selected by the user, the computer-implemented process for transforming a user input into an audio output 100 will then output each attribute 120 assigned to a group of function keys 120 (FIG. 2A) for the element hydrogen. For example, if the user selects the second attribute key 120B (FIG. 1A), which in this example, is configured as the boiling point of the element hydrogen 145, the computer-implemented process for transforming a user input into an audio output 100 then audibly output as spoken words "the boiling point of hydrogen is −252.87° C.".

The user may also sequentially select each attribute key 120 (function key) to audibly output each attribute assigned to a particular function key. For example, the computer-implemented process for transforming a user input into an audio output 100 will audibly output each attribute of the element (item) hydrogen which is selected until the nth attribute key 120$n$ is selected. Thus, if the user selects the nth attribute key 120$n$, the nth attribute of the element hydrogen 120-$n$1, which in this example is assigned the density of hydrogen 155, the computer-implemented process for transforming a user input into an audio output 100 audibly outputs as spoken words "the density of hydrogen is 0.08988 grams per cubic centimeter."

Figure 1B:
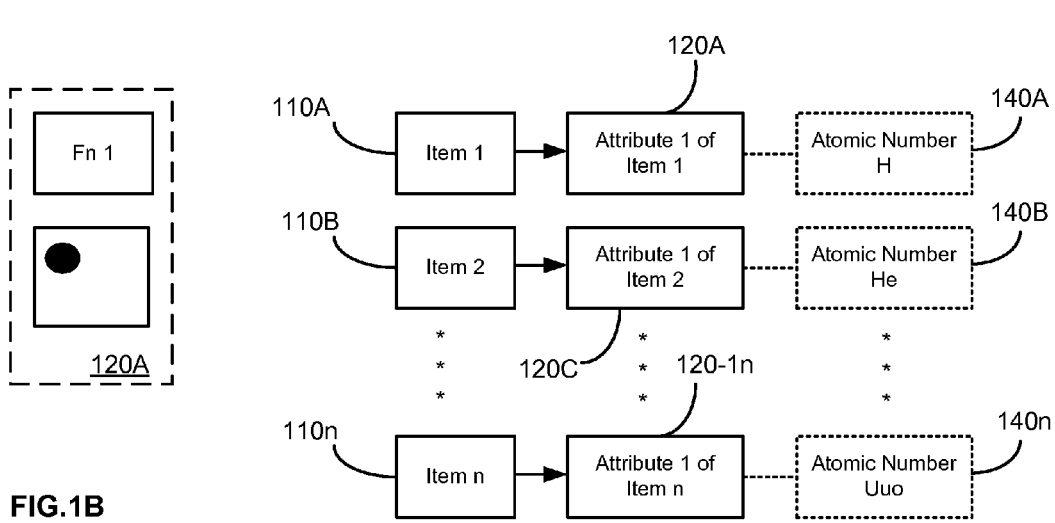
FIG. 1B—depicts selection of one or more contextual attributes in accordance with an exemplary embodiment.

FIG. 1B depicts another exemplary embodiment where the tactile user interface 305 (FIG. 3) is likewise configured in the context of a periodic table of the elements (FIG. 2A). As discussed above, each element included in the periodic table of the elements represents an item 110. Properties (attributes) 120 for each element (item) included the periodic table of the elements represent a physical, chemical, electronic or nuclear property which are tactually selectable using the function keys 120 (FIG. 2A). In this exemplary embodiment, the user first tactually selects using Braille type an attribute of an element 120A using the first attribute key 120A (FIG. 1B). In this example, the computer-implemented process for transforming a user input into an audio output 100 audibly outputs spoken words confirming the attribute for which the first function is configured. In this example, the computer-implemented process for transforming a user input into an audio output 100 would audibly output "Atomic Number." The user may then select an item 110A, which again in this example, refers to the element hydrogen. The computer-implemented process for transforming a user input into an audio output 100 audibly outputs in a spoken language the atomic number for hydrogen, i.e., "the atomic number of hydrogen is one."

Analogously, the user may then tactually select a second item 110B (FIG. 1B), which in this example, is the element "Helium" and so on until the user selects the nth item 110$n$. Selecting the nth item 110$n$ causes the computer-implemented process for transforming a user input into an audio output 100 to audibly output the first attribute of the nth element 120-1$n$, which in this example represents the atomic number of unknown element Uuo 140$n$. The computer-implemented process for transforming a user input into an audio output 100 audibly outputs in spoken language the atomic number for the unknown element as "the atomic number of Uuo is one hundred eighteen." In an exemplary embodiment, the spoken language may be selected by the user by selecting a predefined function or attribute key.

Referring to FIG. 2A, a first contextual input device is shown. In this exemplary embodiment, the contextual input device 200A is configured as a periodic table of the elements. As discussed above, the contextual input device 200A includes a plurality of individual item keys 110. Each of the item keys is provided with Braille type 115 to allow a visually impaired user to tactually select a particular element and/or tactually perceive the spatial or size relationship each element has to one another. Due to space limitations, the Braille type is shown in most cases in the figures as dotted ovals. In this exemplary embodiment, a second set of attribute keys 120 is provided. The second set of keys 120 are configured as attribute or function keys. As discussed above, the attribute keys provide attributes (properties) of the elements provided in the periodic table of the elements 200A. The attribute keys 120 are likewise provided with Braille type 115 to allow a visually impaired user to tactually select a desired attribute of the one or more the elements provided in the periodic table of the elements 200A.

In an exemplary embodiment, an alternate mode key 170 is provided which allows the user to toggle the set of attribute keys 120 into another mode. The alternate mode key 170 is equivalent to an alternate (Alt) or control key (Ctrl) provided on a typical QWERTY keyboard. In an exemplary embodiment, the alternate mode key 170 changes the initial set of attributes 120 to allow access to another set of attributes of the elements provided in the periodic table of the elements 200A. By way of example and not limitation, tactually selecting the alternate mode key 170 may allow the user to audibly output the name of the discoverer of a particular element, when a particular element was discovered, a state of the element at standard temperature and pressure, etc.

Referring to FIG. 2B, a second contextual input device is shown. In this exemplary embodiment, the contextual input device 200B is configured as a map of the United States. Each state is provided with Braille type as discussed above and represents a tactually selectable item. Again, due to space limitations, the Braille type is shown as dotted ovals for the states of Alaska 110X, Hawaii 110Y and California 110Z. Those states not shown with the dotted ovals should be assumed to include the Braille type. In this exemplary embodiment, the shapes of the states and state lines are configured to be tactually discernable to a visually impaired user. In other exemplary embodiments, terrain features such as mountains and valleys may be incorporated into the contextual input device 200B as well. As previously discussed, the set of attribute keys 120 allows a visually impaired user to audibly output an attribute or property of a selected item (state.) For example, an attribute key 120A may be configured to audibly output the population of a selected state, while another attribute key 120n may be configured to audibly output the selected state's highest elevation above sea level, etc.

In an exemplary embodiment, an alternate mode key 170 is provided which allows the user to toggle the set of attribute keys 120 into another mode. As previously discussed, the alternate mode key 170 is the equivalent of an alternate (Alt) or control key (Ctrl) provided on a typical QWERTY keyboard. In an exemplary embodiment, the alternate mode key 170 changes the initial set of attributes 120 to allow access to another set of attributes of the states provided in the map of the United States 200B. By way of example and not limitation, tactually selecting the alternate mode key 170 may allow the user to audibly output the date a particular state became part of the United States, while another attribute key 120n may be configured to audibly output the selected state's area in square miles, etc.

Referring to FIG. 2C, a third contextual input device is shown. In this exemplary embodiment, the contextual input device 200C is configured as a solar system. Each planet in the solar system is provided with Braille type as discussed above and represents a tactually selectable item. Again, due to space limitations, the Braille type is shown as dotted ovals for the star 205 and each of the planets 210, 215, 220, 225, 230, 235, 240, 245. In this exemplary embodiment, the relative spatial distances between planets and/or the star 205 are configured to be tactually discernable to a visually impaired user. In other exemplary embodiments, the proportional size of each planet and star relative to one another may also be tactually discernable to a visually impaired user.

As previously discussed, the set of attribute keys 120 allows a visually impaired user to audibly output an attribute of an item (planet or star.) For example, an attribute key 120A may be configured to audibly output the distance of a particular planet from the star 205, while another attribute key 120n may be configured to audibly output the diameter of a particular planet or the star 205, etc. In an exemplary embodiment, an alternate mode key 170 is provided which allows the user to toggle the set of attribute keys 120 into another mode. As previously discussed, the alternate mode key 170 is equivalent to an alternate (Alt) or control key (Ctrl) provided on a typical QWERTY keyboard. In an exemplary embodiment, the alternate mode key 170 changes the initial set of attributes 120 to allow access to another set of attributes of the planets and/or star provided in the solar system 200C. By way of example and not limitation, tactually selecting the alternate mode key 170 may allow the user to audibly output the date a particular planet was discovered, while another attribute key 120n may be configured to audibly output the person or persons who discovered a particular planet, etc.

Referring to FIG. 3, a block diagram of a contextual input device is depicted. In an exemplary embodiment, the contextual input device 200 includes a tactile user interface 305. The tactile user interface 305 is provided with tactually discernable keys as previously discussed above. The tactually discernable keys 120 (FIG. 2A) are configured to allow a visually impaired user to tactually perceive proportional spatial and/or size relationships between and among each of the items being replicated by the contextual input device 200. In addition, each of the tactually discernable keys is provided with Braille type to allow a visually impaired user to determine the item or attribute which is assigned to a particular tactually discernable key.

The tactile user interface 305 is electronically coupled to an input device controller 310. The input device controller 310 is typically a microprocessor based circuit which detects a change in a state of a particular tactually discernable key. The input device controller 310 thus transforms changes in state of a user selected tactually discernable key into a unique code which is electronically communicated to a processor 315 for determination of the user's selection. The processor(s) 315 is programmed to determine the user's selection using executable instructions of the computer-implemented process for transforming a user input into an analog audio output 100.

The computer-implemented process for transforming a user input into an audio output 100 may be encoded into ROM 320, RAM 325 and/or retrieved from a datastore 345. The ROM 320, RAM 325 and datastore 345 are electronically coupled to the processor(s) 315 as is described in the discussion accompanying FIG. 4 below. In various embodiments, the datastore 345 may be incorporated as part of the executable code contained in ROM 320, loaded into RAM 325 and/or maintained as a separate electronic data storage device.

An audio processing subsystem 330 is electronically coupled to the processor 315. In an exemplary embodiment, the audio processing subsystem 330 transforms a retrieved digitally-encoded audio file into audible speech. By way of example and not limitation, including *.wav, *.mpeg, *.mp3, *.mp4/m4a, *.wma, and other well-established standard audio-encoding file formats known in the relevant art. In this exemplary embodiment, the digital audio file is played and transformed into an analog audio signal using a hardware or software CODEC (COder-DECoder) and digital-to-analog converter. The analog audio signal generated by the audio processing subsystem 330 is then output to an electro-acoustic transducer 350. In another embodiment, the audio processing subsystem 330 transforms a retrieved digital text file into audible speech. By way of example and not limitation, *.txt,

*.asc, *.doc formatted files. In this exemplary embodiment, the digital text file is transformed into an analog audio signal using a CODEC and digital-to-analog conversion.

The analog signal is then output to an electro-acoustic transducer 350. In another embodiment, the audio processing subsystem 330 performs both text to speech and digital audio file transformation. The electro-acoustic transducer 350 is typically an audio speaker. However, other embodiments of the electro-acoustic transducer 350 may utilize jawbone or cochlear sound conduction for use in noisy environments and/or for those users who may be both hearing and visually impaired. The audio processing subsystem 330 including a CODEC, digital-to-analog converter and audio amplification circuit and may be provided as a separate unit or computer-integrated device; for example, a personal computer soundcard.

In an exemplary embodiment, a video processing subsystem 335 is provided which visually outputs to a display 340 the subject matter (context) of the tactile user interface 305, item 110 and/or attribute 120 selections made by the user. The video processing subsystem 335 is typically provided as a hardware device; for example, a personal computer video card.

In an exemplary embodiment, the datastore 345 includes a library 375 of related items 110 and contextual attributes 120. The library 375 has operatively stored therein a plurality of addressable contextual items 110A, 110B and a plurality of addressable contextual attributes 120A, 120B, 120C, 120D, 120E, 120n. The items 110A, 110B and attributes 120A, 120B, 120C, 120D, 120E, 120n are referentially linked with one another to allow selection of either an item 110 or an attribute 120 using the tactile user interface 305. Each item 110A, 110B and each attribute 120A, 120B, 120C, 120D, 120E, 120n stored in the library 375 are uniquely identified with an index code (not shown) compatible with the unique codes generated by the input device controller 310. The unique index codes are linked with a counterpart audio output file 355A, 355B, 360A, 360B, 360C, 360D, 360E, 360n. Selection of an item 110A, 110B or attribute 120A, 120B, 120C, 120D, 120E, 120n from the tactile user interface 305 causes the processor(s) 315 executing the computer-implemented process for transforming a user input into an audio output 100 to match a library entry with the unique code generated by the input device controller 310. The matching library entry is then retrieved from the library 375, processed by the audio processing subsystem 330 and audibly output with the electro-acoustic transducer 350. As discussed above, the library entry matched using the computer-implemented process for transforming a user input into an audio output 100 is either a digitized audio file, a digital text file (e.g., ASCII file) and/or a combination of both 355A, 355B, 360A, 360B, 360C, 360D, 360E, 360n.

Implementation Mechanisms—Hardware Overview

Figure 4:
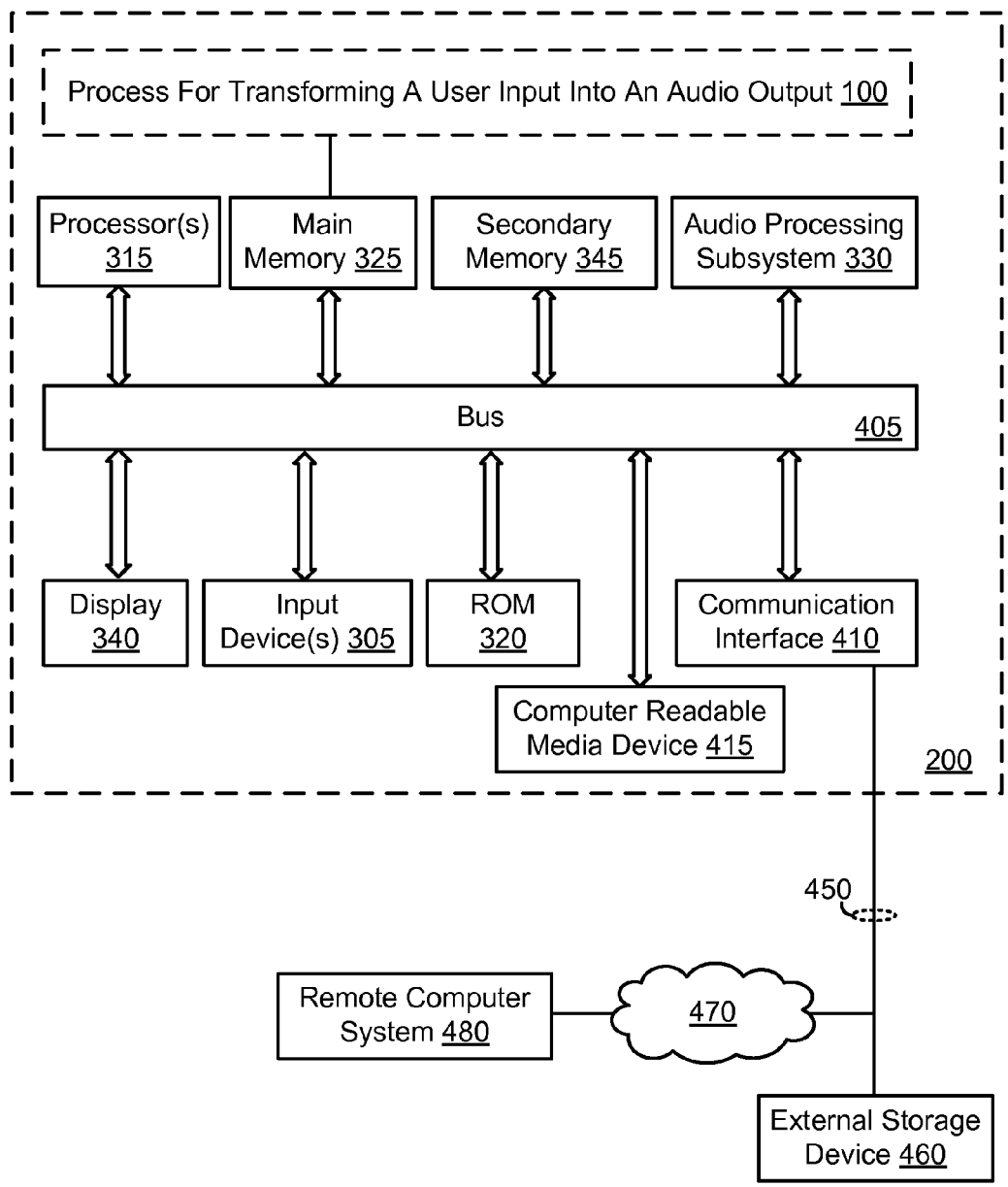
FIG. 4—depicts a block diagram of a contextual input device upon which various exemplary embodiments of a computer-implemented process for transforming a user input into an audio output may be implemented.

FIG. 4 depicts an exemplary block diagram of a contextual input device 200 upon which inventive embodiments of the computer-implemented process for transforming a user input into an audio output 100 may be implemented. In an exemplary embodiment, the contextual input device 200 is implemented as a form of a Turing machine which transforms unrelated digital files into tagged families of digitals files from which a Turing machine component verifies that the tagged files are authorized to operate based on state tables installed on the Turing machine. The state tables forming policies which control the usage of the various tagged files. In an exemplary embodiment, the Turing machine is a computer.

In an exemplary embodiment, the contextual input device 200 may incorporate tactile arrays which communicate by the sense of touch. For example, patterns of depressed pins in a tactile array may be discerned by the user to represent letters, words, or concepts. In this way, users who may be both visually and hearing impaired may thus interact with the contextual input device 200.

The contextual input device 200 includes a bus 405 or other communication mechanism for communicating information, and one or more processors 315 coupled with the bus 405 for processing information. The contextual input device 200 further includes a main memory 325, such as a random access memory (RAM) or other dynamic storage devices coupled to the bus 405 for storing information and instructions to be executed by the processor(s) 315. For example, the computer-implemented process for transforming a user input into an audio output 100. The main memory 325 may also be used for storing temporary variables or other intermediate information during execution of instructions to be executed by the processor(s) 315. The contextual input device 200 further includes a read only memory (ROM) 320 or other nonvolatile data storage device coupled to the bus 405 for storing static information and instructions for processor(s) 315. A secondary memory 345, such as a magnetic disk or optical disk, is provided and coupled to the bus 405 for storing information and instructions.

The contextual input device 200 may be coupled via the bus 405 to a display 340, such as a cathode ray tube (CRT) or light emitting diode display (LED), for displaying information to a computer user. One or more tactile input devices 305, including alphanumeric, function keys and/or Braille labeled keys, is coupled to the bus 405 for communicating information and command selections to the processor 315. In an exemplary embodiment, another type of user input device provides cursor control, such as a mouse, a trackball, or cursor direction keys for communicating direction information and command selections to the processor(s) 315 and for controlling cursor movement on the display 340.

The various inventive embodiments described above are related to the use of the contextual input device 200 for implementing the techniques described herein. According to one inventive embodiment, those techniques are performed by the contextual input device 200 in response to the processor(s) 315 executing one or more sequences of one or more instructions contained in the main memory 325. Such instructions may be read into the main memory 325 from the secondary memory 345, or an external storage device 460. Execution of the sequences of instructions contained in the main memory 325 causes the processor(s) 315 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer readable media" 415 as used herein refers to any tangible media that participates in providing data that causes a machine to operation in a specific fashion. In an exemplary embodiment implemented using the contextual input device 200, various computer readable media are involved, for example, in providing instructions to the processor(s) 315 for execution. Such a medium may take many forms, including but not limited to storage media and transmission media. Computer readable media 415 includes both non-volatile media and volatile media. Non-volatile media includes, for example, optical or magnetic disks, such as the external storage device 460. Volatile media includes dynamic memory, such as main memory 325.

Transmission media include metal wires, coaxial cables, fiber optical cables, and wireless transmission, including a plurality of signal transfer elements that comprise the input/output bus 405. Transmission media can also take the form of microwave or light waves, such as those generated during radiowave and infrared data communications. All such media must be tangible to enable the instructions carried by the media to be detected by a physical mechanism that reads the instructions into a machine.

Common forms of computer readable media 415 include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, EEPROM, FLASH-RAM and/or any other memory chip or cartridge, a carrier wave as described hereinafter, or any other medium from which a computer can read.

Various forms of computer readable media may be involved in carrying one or more sequences of instructions to the processor(s) 315 for execution. For example, the instructions may initially be carried on a magnetic disk of a remote computer. A remote computer system 480 can load the instructions into its dynamic memory and send the instructions over a telephone line using a modem. A modem local to the contextual input device 200 can receive the data on the telephone line and use an infra-red transmitter to convert the data to an infra-red signal. An infra-red detector can receive the data carried in the infra-red signal and appropriate circuitry can place the data on the bus 405. The bus 405 carries the data to main memory 325, from which the processor(s) 315 retrieves and executes the instructions. The instructions received by the main memory 325 may optionally be stored on the external storage device 460 either before or after execution by the processor(s) 315.

The contextual input device 200 also includes a communication interface 410 coupled to the bus 405. The communication interface 410 provides a two-way data communication coupling to a network link 450 that is connected to a network 470. For example, the communication interface 410 may be an integrated services digital network (ISDN) card or a digital subscriber line (DSL) modem to provide a data communication connection to a corresponding type of telephone line. As another example, the communication interface 410 may be a local area network (LAN) card to provide a data communication connection to a compatible LAN.

Wireless links may also be implemented. In any such implementation, the communication interface 410 sends and receives electrical, electromagnetic and/or optical signals that carry digital data streams representing various types of information. The communications link 450 typically provides data communication through one or more networks 470 to other data devices. For example, the communications link 450 may provide a connection through the network 470 to a remote computer system 480. The communications link 450 and the network 470 may use electrical, electromagnetic and/or optical signals that carry digital data streams. The signals transmitted through the network 470 and the signals on the network link 450 and through the communication interface 410, which carry the digital data to and from the contextual input device 200, are exemplary forms of carrier waves transporting the information. By way of example and not limitation, an 802.11x wireless transceiver, a Bluetooth™ or other "Personal Area Network" communications device may serve as the communications interface 410.

The contextual input device 200 can send messages and receive data, including program code, through the network 470, the communications link 450 and the communication interface 410. The received code may be executed by the processor(s) 315 as it is received, and/or stored in the secondary memory 345 or on computer readable media device 415, or other non-volatile storage for later execution. In this manner, the contextual input device 200 may obtain application code in the form of a carrier wave.

Where necessary, computer programs, algorithms and routines are envisioned to be programmed in a high level language object oriented language, for example Java, C, C++, C#, CORBA, Visual Basic, JavaScript, Perl, and/or Python. Database components may utilize any common database program, by way of example and not limitation, ORACLE, Sequel Server, MySQL, SQL, MS ACCESS, DB2, MS FOXBASE, DBASE, PostgreSQL and RBASE.

For purposes of this disclosure, the term "program" is intended to be interpreted in its broadest sense to include all instructions executable by a processor whether embodied in hardware or software. Where applicable, references to various programs may be made in both singular and plural form. No limitation is intended by such grammatical usage as one skilled in the art will appreciate that multiple programs, objects, subprograms, subroutines, algorithms, applets, contexts, order of process execution, etc. may be implemented programmatically to implement the various inventive embodiments.

5.0 Extensions and Alternatives

In the foregoing specification, the various exemplary inventive features have been described with reference to specific embodiments herein. It will, however, be appreciated by a person having ordinary skill in the art that various modifications and changes may be made thereto without departing from the broader spirit and scope of the various inventive embodiments disclosed. The specification and drawings are, accordingly, to be regarded in an exemplary rather than a restrictive sense.

What is claimed:

1. A computer implemented process for transforming a user input into an audio output comprising:
    receiving a digital input signal from a contextual input device, the contextual input device comprising a plurality of tactually discernable keys disposed in a spatial relationship which proportionally replicates a spatial relationship among a plurality of items associated with a known physical object;
    determining whether the digital input signal represents a selection of an item from among the plurality of items or an attribute pertaining to an item among the plurality of items;
    transforming the digital input signal into an analog audio signal;
    outputting the analog audio signal with an electro-acoustic transducer
    wherein the known physical object is a periodic table of the elements, the plurality of items are the elements contained in the periodic table of the elements, and the attribute pertaining to an item among the plurality of items is a property pertaining to an element in the periodic table of elements.

2. The computer implemented process of claim 1 wherein transforming the digital input signal into an analog audio signal further comprises:
    transforming the digital input signal into a unique code;
    matching the unique code with a library entry;
    audibly outputting the library entry.

3. The computer implemented process of claim 1 wherein the attribute represents a discrete fact pertaining to an item among the plurality of items.

4. The computer implemented process of claim 1 wherein the tactually discernable keys are labeled with Braille type.

5. The computer implemented process of claim 1 wherein the property is selected from the group consisting of an electronic property, a chemical property, a nuclear property and a physical property.

6. The computer implemented process of claim 1 wherein selection of an item from among the plurality of items audibly outputs a name of element in the periodic table of the elements.

7. The computer implemented process of claim 1 wherein selection of an attribute pertaining to an item among the plurality of items audibly outputs a property of an element in the periodic table of the elements.

8. The computer implemented process of claim 1 wherein the outputted analog signal is generated by one of electronically synthesized speech, prerecorded speech and a combination thereof.

9. A computer system for transforming a user input into an audio output comprising:
   one or more processors internal to the computer system;
   a contextual input device coupled to the one or more processors comprising a plurality of tactually discernable keys disposed in a spatial relationship which proportionally replicates a spatial relationship among a plurality of items associated with a known physical object;
   an audio processing subsystem coupled to the one or more processors;
   an electro-acoustic transducer coupled to the audio processing system;
   a memory coupled to the one or more processors comprising executable instructions which when executed by the processor, causes the one or more processors to;
   receive a digital input signal from a contextual input device;
   determine whether the digital input signal represents a selection of an item from among the plurality of items or an attribute pertaining to an item among the plurality of items;
   transform the digital input signal into an analog audio signal with the audio processing subsystem;
   output the analog audio signal with the electro-acoustic transducer
   wherein the known physical object is a periodic table of the elements, the plurality of items are the elements contained in the periodic table of the elements, and the attribute pertaining to an item among the plurality of items is a property pertaining to an element in the periodic table of elements.

10. The computer system of claim 9 wherein transforming the digital input signal into an analog audio signal further comprises instructions which when executed by the one or more processors causes the one or more processors to:
   transform the digital input signal into a unique code;
   match the unique code with a library entry;
   audibly output the library entry.

11. The computer system of claim 9 wherein the tactually discernable keys are labeled with Braille type.

12. The computer system of claim 9 wherein the property is selected from the group consisting of an electronic property, a chemical property, a nuclear property and a physical property.

13. The computer system of claim 9 wherein selection of an item from among the plurality of items audibly outputs a name of element in the periodic table of the elements.

14. The computer system of claim 9 wherein selection of an attribute pertaining to an item among the plurality of items audibly outputs a property of an element in the periodic table of the elements.

15. The computer system of claim 9 wherein the outputted analog signal is generated by the audio processing subsystem using one of electronically synthesized speech, prerecorded speech and any combination thereof.

16. A computer program product embodied in a tangible form for transforming a user input into an audio output comprising executable instructions which when executed by one or more processors internal to a computer system causes the one or more processors to:
   receive a digital input signal from a contextual input device coupled to the one or processors, the contextual input device comprising a plurality of tactually discernable keys disposed in a spatial relationship which proportionally replicates a spatial relationship among a plurality of items associated with a known physical object;
   determine whether the digital input signal represents a selection of an item from among the plurality of items or an attribute pertaining to an item among the plurality of items;
   transform the digital input signal into an analog audio signal with an audio processing subsystem coupled to the one or more processors;
   output the analog audio signal with an electro-acoustic transducer coupled to the audio processing subsystem
   wherein the known physical object is a periodic table of the elements, the plurality of items are the elements contained in the periodic table of the elements, and the attribute pertaining to an item among the plurality of items is a property pertaining to an element in the periodic table of elements.

17. The computer program product of claim 16 wherein transforming the digital input signal into an analog audio signal further comprises instructions which when executed by the one or more processors causes the one or more processors to:
   transform the digital input signal into a unique code;
   match the unique code with a library entry;
   audibly output the library entry.

18. The computer program product of claim 16 wherein the tactually discernable keys are labeled with Braille type.

19. The computer program product of claim 16 wherein selection of an item from among the plurality of items audibly outputs a name of element in the periodic table of the elements.

20. The computer program product of claim 16 wherein selection of an attribute pertaining to an item among the plurality of items audibly outputs a property of an element in the periodic table of the elements.

* * * * *